United States Patent [19]

Iwasaki

[11] Patent Number: 4,850,084
[45] Date of Patent: Jul. 25, 1989

[54] STRUCTURE FOR ANCHORING WIRE END
[75] Inventor: Kenji Iwasaki, Nishinomiya, Japan
[73] Assignee: Nippon Cable System Inc., Hyogo, Japan
[21] Appl. No.: 163,435
[22] Filed: Mar. 3, 1988
[30] Foreign Application Priority Data
Mar. 17, 1987 [JP] Japan .............................. 62-38860[U]
[51] Int. Cl.⁴ ............................................. F16G 11/00
[52] U.S. Cl. ................... 24/115 R; 24/136 L; 403/353
[58] Field of Search ............ 24/115 R, 136 L; 403/353

[56] References Cited
U.S. PATENT DOCUMENTS

| | | | |
|---|---|---|---|
| 1,552,338 | 9/1925 | Munro | 403/353 |
| 1,569,021 | 1/1926 | Jorgensen | 403/353 |
| 1,584,830 | 5/1926 | Bardon | 403/353 |
| 3,066,371 | 12/1962 | Mullens | 403/353 |
| 3,349,745 | 10/1967 | Berg | 24/115 R |
| 3,636,594 | 1/1972 | Faivre | 403/353 |

FOREIGN PATENT DOCUMENTS

| | | | |
|---|---|---|---|
| 60-94571 | 6/1985 | Japan . | |
| 60-108813 | 7/1985 | Japan . | |
| 60-94570 | 6/1986 | Japan . | |
| 91851 | 4/1958 | Norway | 403/353 |
| 995428 | 6/1965 | United Kingdom | 403/353 |

Primary Examiner—Victor N. Sakran
Attorney, Agent, or Firm—Armstrong, Nikaido, Marmelstein, Kubovcik & Murray

[57] ABSTRACT

A structure for anchoring a wire end having a nipple fixed to the wire, comprising a body having a recessed portion, a groove communicated to the recessed portion, a cover plate partially covering the recessed portion at the front side toward which the groove is opened, and a space for serving insertion of the wire end, provided at the rear side of the body.

8 Claims, 6 Drawing Sheets

STRUCTURE FOR ANCHORING WIRE END

BACKGROUND OF THE INVENTION

The present invention relates to a structure for anchoring a wire end, and particularly, to an improvement of an anchoring structure suitably applicable tot a drum for winding an inner wire of a push-pull control cable, a pull control cable, and the like, in which an anchored wire end does not easily slip out of a receiving recessed portion.

In a conventional wire-winding drum, for example, equipped in a wire-driving device of a window regulator, a structure shown in FIG. 7 is employed as a means for anchoring a wire end in order to enable an easy attachment and detachment when the device is assembled or disassembled.

In the present specification, as shown in FIG. 7, a wire end 34 means a combination of a cable or wire 34a and an anchor or nipple 34b fixed to an end of the wire 34a.

In the conventional structure shown in FIG. 7, the wire 34a extends in a radial direction of the nipple 34b. The wire 34a is generally formed of a metal strand of wires. The nipple 34 is generally formed of a metal strand of wires. The nipple 34 is generally made of a relatively thin cylinder-like metal and has a diameter far larger than the outer diameter of the wire 34a and a thickness slightly larger than the outer diameter of the wire 34a.

A wire-winding drum 33 is provided witht a projection which has a hollow space like a key-hole having a side view corresponding to that of the wire end 34. That is to say, the hollow space comprises an open groove 31 having substantially constant depth along its length for the wire portion 34a, and an open recessed portion 32 for the nipple 34b.

The recessed portion 32 generally has a cylinder-like inner peripheral surface for receiving the nipple 34b without excess gap and has a depth deeper than that of the groove 31. The openings of the recessed portion 32 and the groove 31 are situated at the same side and are communicated with each other.

It the above-mentioned anchoring structure, the wire end 34 can be attached to the drum 33 by a parallel motion toward the drum, i.e. in the direction of arrow C, and can be detached from the drum by moving in the reverse direction.

However, the conventional structure has a drawback that the wire end 34 easily slips out of the groove 31 and the recessed portion 32 during the pushpull operation or pull-release operation of the wire 34a.

Now, it is to be understood that, though an inner wire of pull-control cable is not adapted to sufficiently receive a compression force, the wire can actually transmit an axial compression force in some extent based on construction thereof. That is to say, though a long wire serves as a flexible cord and cannot support axial compression force, a short section of the wire can serve as a flexible or yieldable rod for a weak axial compression force.

Therefore, not only a push-pull control cable, but also a pull control cable has the above-mentioned drawback.

In order to eliminate the above-mentioned drawback, Japanese Unexamined Utility Model Publications Nos. 108813/1985, 94570/1985 and 94571/1985 proposed some improved constructions.

The publications Nos. 108813/1985 and 94571/1985 disclose constructions each comprising a recessed portion provided with inwardly projecting projections capable of engaging with a peripheral surface of a nipple. In those constructions, the nipple is also inserted into the recessed portion by a parallel motion. However, since front openings are narrowed in those construction, there are disadvantages that detaching (and also the attaching) cannot be easily performed.

The publication No. 94570/1985 discloses a construction which has an oval recessed portion covered with cover plates while remaining an opening. In the construction, a nipple can be easily attached and detached. However, since the opening is larger than the plan view of the nipple, there is a disadvantage that the construction cannot sufficiently prevent an escape of the nipple.

An object of the present invention is to eliminate the above-mentioned problems and to provide a structure for anchoring a wire end in which the wire end can be easily attached to a recessed portion in assembling and detached in disassembling, and further, the wire does not easily slip out of the recessed portion during use.

SUMMARY OF THE INVENTION

In accordance with the present invention, there is provided a structure for anchoring a wire end having a wire portion and a nipple fixed to the wire portion. The structure comprises a body having a front surface and a recessed portion formed in the body. The recessed portion has an inner surface. The dimension of the recessed portion is slightly larger than the dimension of the nipple. The body further has a groove having a dimension capable of housing the wire portion, communicating with said recessed portion and opening toward the front surface. The body has a cover plate partially covering the recessed portion at the front surface side. A space for serving for insertion of the wire end is provided at the rear side opposite to the front surface side.

The recessed portion can be opened or closed at the rear side.

In the above-mentioned anchoring structure of the present invention, the nipple housed in the recessed portion cannot move toward the opening of the groove, i.e. toward the front surface, due to the cover plate.

On the contrary, the wire portion cannot move toward the rear side of the recessed portion due to the bottom of the groove.

Further, the space provided at the rear side of the recessed portion provides a required space for movement of the nipple when the wire end is inserted into the recessed portion and is detached from the recessed portion.

Hereinafter, the anchoring structure of the present invention is explained with reference to the accompanying drawings.

DETAILED DESCRIPTION

Figure 2:
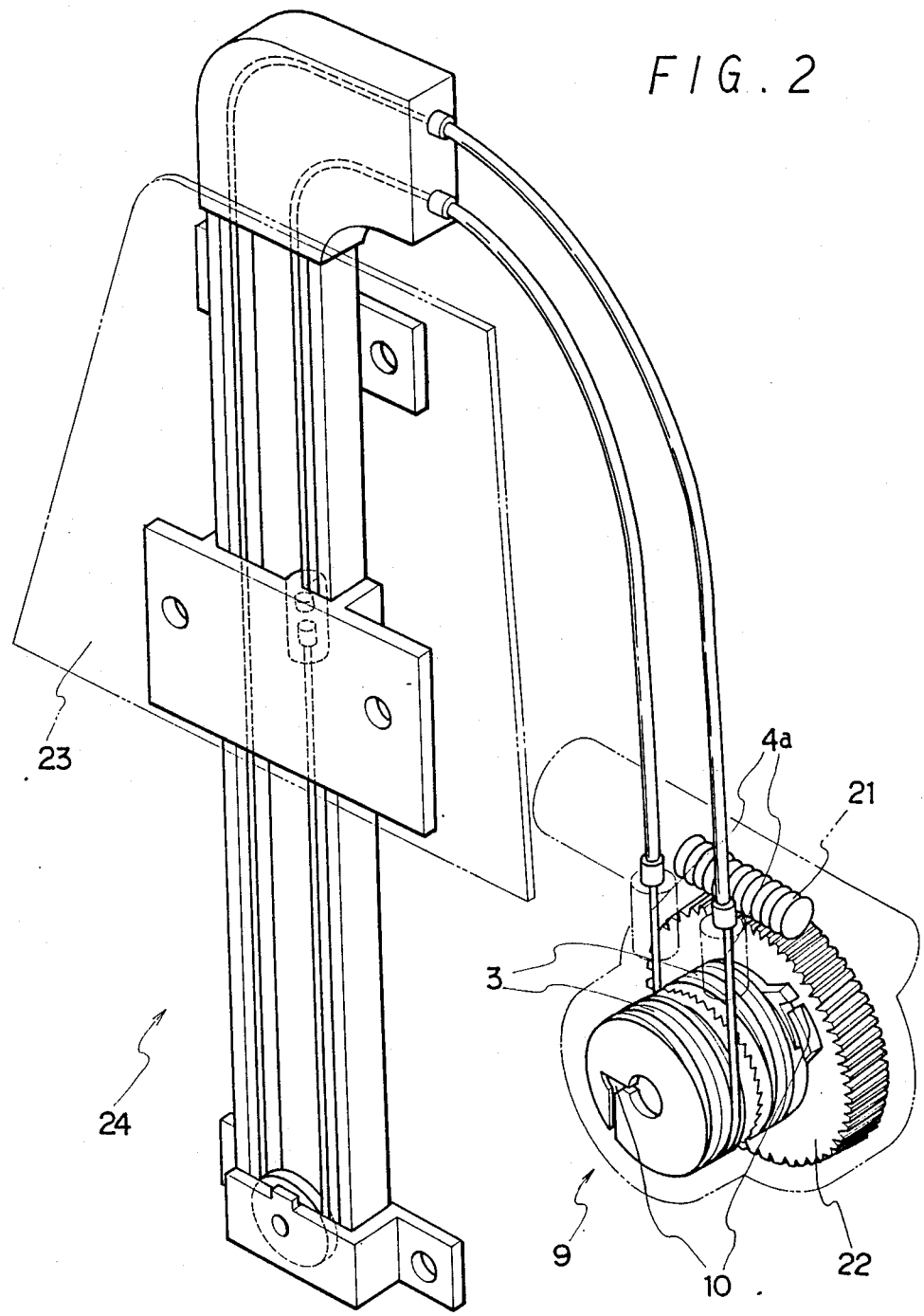
FIG. 2 is a perspective view showing an example of a windodw regulator to which the structure of FIG. 1A is applied.

At first, referring to FIG. 2, the whole construction of a window regulator is explained.

The window regulator of FIG. 2 comprises a driving device 9 for converting a rotary motion of a worm 21 into linear motions of two wires 4a by transmitting the rotary motion to a drum 3 through a worm wheel 22 and by winding one of the wires onto the drum and rewidning the other wire from the drum. Each wire 4a has an end anchored to the respective anchoring member of anchoring structure 10 of the drum 3, and the wires 4a are wound on the drum in opposite directions. The opposite ends of the wires 4a are connected to a window glass 23.

The window regulator further comprises a driven device 24 for guiding the window glass 23 in an opening-and-closing directions thereof.

Figure 1A:
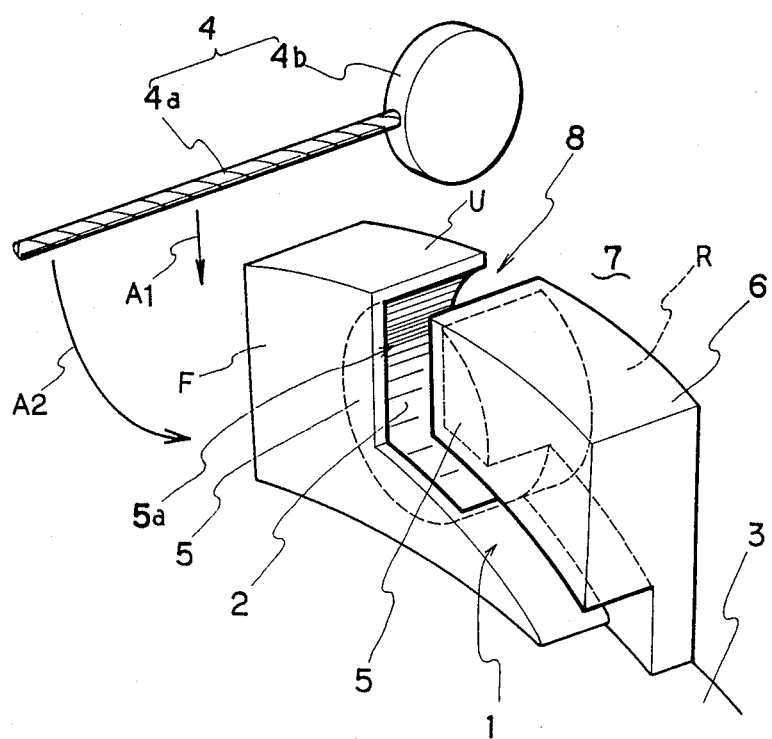
FIG. 1A is a perspective view showing an embodiment of the structure for anchoring a wire end of the present invention.
Figure 1B:
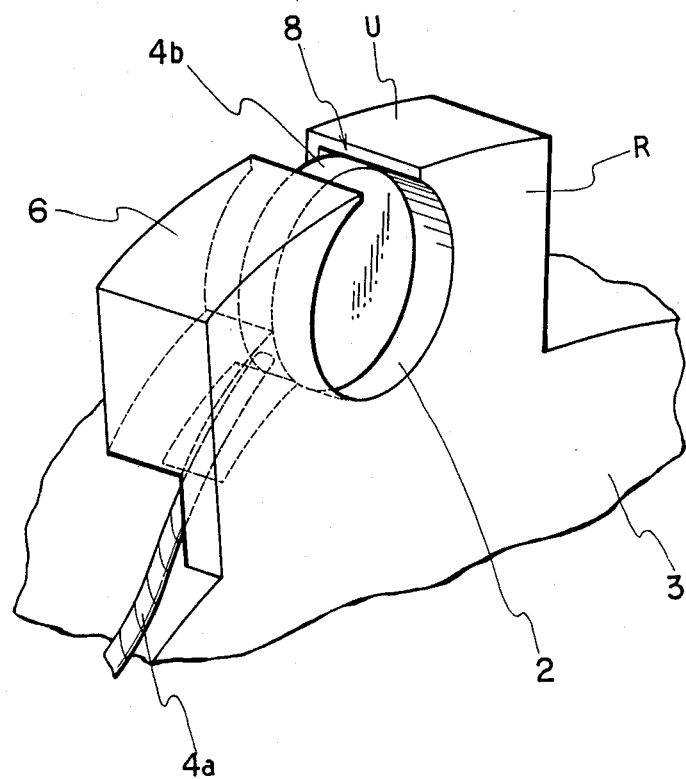
FIG. 1B is a perspective view of the structure of FIG. 1A in a rear side.

Detail of the above-mentioned anchoring structure 10 is shown in FIGS. 1A and 1B.

The drum 3 is provided with a projection 6 having a front surface F, a rear surface R and an upper surface U. The projection 6 has an open groove 1 and a recessed portion 2 corresponding to the shape of the wire end 4. The groove 1 is communicated with the recessed portion 2 and is opened toward the front surface F. The recessed portion 2 is partially covered with a cover plate 5 at the front surface side, i.e. at the groove opening side. The cover plate 5 is separated into two parts so that a slit 5a is remained, and the slit 5a is also communicated with the groove 1. The rear surface R side of the recessed portion 2 is opened to form a space 7 for allowing an insertion of the wire end. Further, the upper surface U of the projection 6 is provided with a cut portion 8 communicating to the recessed portion 2, the slit 5a and the rear side opening of the recessed portion, recpectively. The cut portion 8 and the slit 5a have a width broader than the diameter of the wire 4a.

The wire end 4 comprising a wire portion 4a and a nipple 4b can be attached to the above-mentioned projection 6 in the order mentioned hereinafter.

At first, the wire end 4 is arranged in a direction perpendicular with the frontn surface F of the projection 6. The wire end 4 is further moved in the direction of arrow A1 in order to insert the wire portion 4a through the cut portion 8 and the slit 5a.

Then wire end 4 is turned as shown by arrow A2, and the wire portion 4a is inserted into the groove 1 through the slit 5a. Therefore, the nipple 4b is engaged with the inner peripheral surface of the recessed portion 2, as shown in FIG. 1B.

In the above-mentioned steps, the nipple 4b can be inserted through the rear side opening of the recessed portion 2. However, if the width of the cut portion 8 is larger than the thickness (axial length) of the nipple 4b, the nipple 4b also can be inserted through the cut portion 8.

The wire end 4 can be detached from the projection 6 of hte drum 3 in a reverse order of the above mentioned.

For example, in case that the above-mentioned structure 10 is applied to a wire-winding drum of a window regulator, even if the top portio nof the wire end 4 is abutted against the inner peripheral surface of the recessed portion 2 due to a diflection or yield of the wire 4a or the like, the wire end 4 does not get out of the recessed portion 2 since the cover plate 5 and the bottom of the groove 1 prevent the nipple 4b from movements toward the opening side of the groove 1 and toward the rear opening side of the recessed portion 2, respectively.

Figure 3:
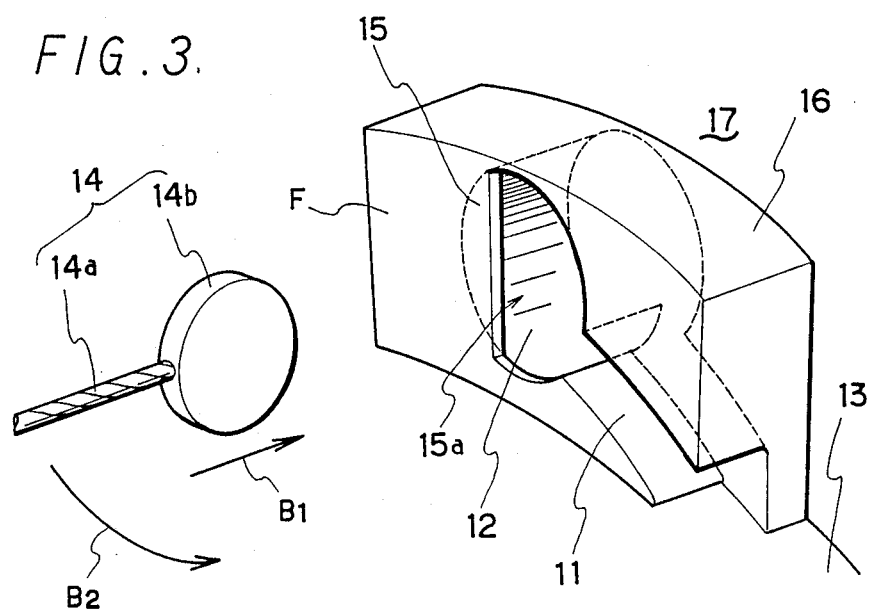
FIG. 3 is a perspective view showing another embodiment of the anchoring structure of the present invention.

FIG. 3 shows another embodiment of the anchoring structure of the present invention. In the structure of FIG. 3, a projection 16 of a drum 13 is provided with a groove 11 and a recessed portion 12 which are arranged to form a key-hoole shape corresponding to the wire end 14 as same as the structure of FIG. 1.

Further the recessed portion 12 is covered with a bow-shaped cover plate 15 so as to remain a front opening 15a capable of allowing the nipple's insertion therethrough. The opening 15a is communicated to the groove 11.

In the present structure of FIG. 3, the wire end 14 can be attached to the projection 16 by the following steps.

At first, the wire end 14 is arranged in a direction perpendicular with the front surface F, and the wire end 14 is inserted through the opening 15a by moving in a direction of arrow B1. Next, the wire end 14 is turned in the direction of arrow B2, and then, the wire portion 14a is inserted into the groove 11 and the nipple 14b is engaged with the inner surface of the recessed portion 12.

The wire end 14 can be detached in a reverse order of the above mentioned.

In the present embodiment, the wire end 14 is prevented from slipping out of the drum 13 during the use, since the cover plate 15 restrict the movement of the wire 14a toward the groove-opening side.

Figure 4:
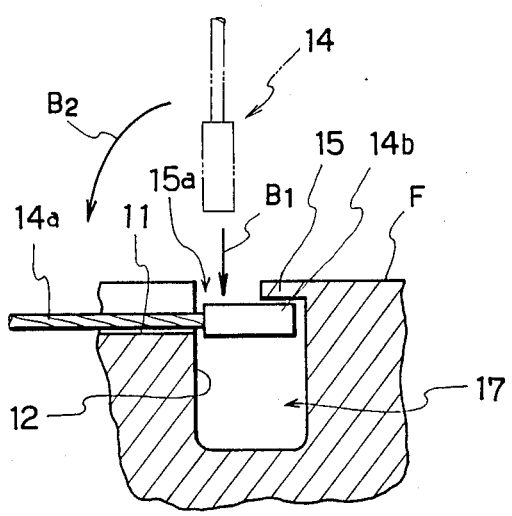
FIG. 4 is a sectional view showing further another embodiment of the anchoring structure of othe present invention.

In the structure shown in FIG. 3, the botom side of the recessed portion 12 can be closed as is shown in FIG. 4, since the front opening 15a is so large that the nipple 14b can pass through.

Referring to the mechanism of FIG. 4, an inner hollow space 17 is provided for allowing a turn of the wire end 14. That is to say, the wire end 14 arranged in the direction perpendicular with the frontt surface F of the body is moved in a direction of arrow B1 and inserted into the recessed portion 12 and the hollow space 17 through the opening 15a. Further, the wire end 14 is turned as shown by arrow B2 in the same manner as the case of FIG. 3. Then the wire end 14 can be engaged with the body or projection.

Each nipple 4b, 14b mentioned aboved has a disclike shape and is fixed to the wire 4a, 14a so that the wire 4a, 14a extends in a radial direction of the nipple 4b, 14b. However, in the present invention, the shape and fixing manner of the nipple are not limited to the above-mentioned case.

Figure 5:
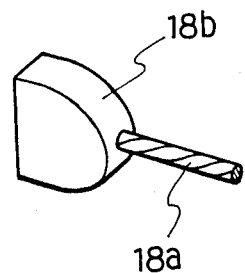
FIG. 5 is a perspective view showing another embodiment of a wire end to be anchored in the anchoring construction of the present invention.

For example, FIG. 5 shows a wire end having a nipple 18b having a U-shaped side view and a wire 18a fixed to the center of an arc-shaped portion of the nipple 18b. The nipple 18b can be engaged with a recessed portion in the same manner as mentioned above.

Figure 6:
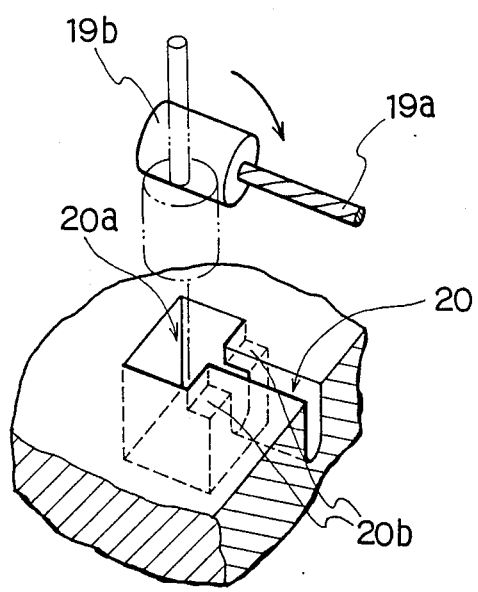
FIG. 6 is a perspective view showing another embodiment of the anchoring structure of the present invention.
Figure 7:
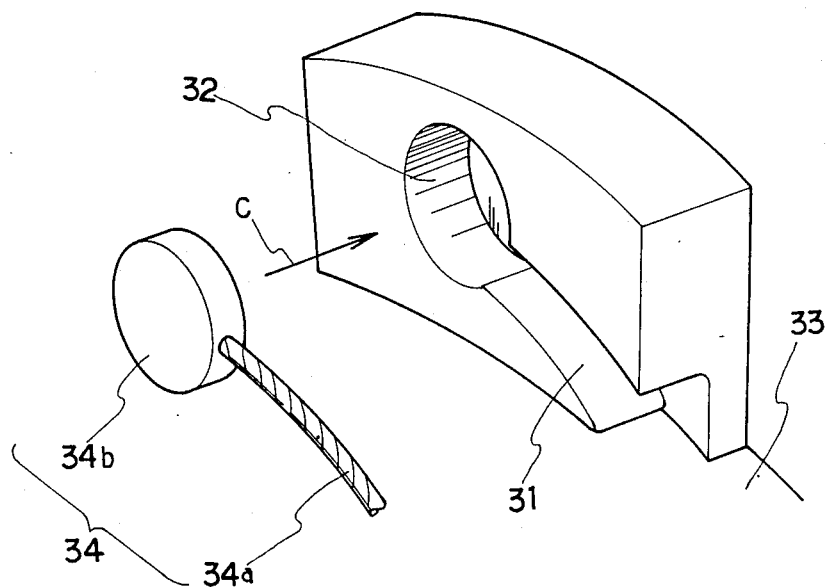
FIG. 7 is a perspective view showing an example of a conventional structure for anchoring a wire end.

FIG. 6 shows another nipple 19b having a relatively long cylinder-like shape. The nipple 19b is fixed to he wire 19a so that the center axis of the nipple 19b accords with the axis of the wire 19a.

The nipple 19b can be anchored, for instance, in a cube-like hole 20a of a body or projection. The hole 20a is communicated with an open groove 20 for housing the wire 19a. There is provided a pair of catch plates 20b at the uppe periphery of the hole 20a and at the both sides of the open groove 20. The catch plates 20b serve as a cover plate for catching the nipple 19b.

As explained above referring to several embodiments, the sturcture of the present invention has advantages that the construction is very simple, unrequired disengage between the wire end and the structure can be suitably prevented, and the attachment/detachment of the wire end can be easily carried out.

Though several embodiments are described in detail, it is to be understood that the present invention is not limited to the above-mentioned embodiments, and various changes and modifications may be made in the invention without departing from the spirit and scope thereof.

What is claimed is:

1. A wire anchoring apparatus for anchoring a wire provided with a disc-shape nipple at the end thereof, said wire being connected to a cylindrical edge of said disc-shape nipple, said wire anchoring apparatus comprising:
   a drum havingn a circumferential edge; and
   a wire retaining means for retaining said disc-shape nipple therein, said wire retaining means being provided with a groove extending from and being adjacent to said circumferential edge of said drum, said groove having a first narrow side opening and first and second end openings at both ends thereof, said first end opening being open at said circumferential edge of said drum, said wire retianing means further being provided with a substantially circular recess provided at said second end opening, said substantially circular recess having a second narrow side opening directly connected to said first narrow side opening, wherein the width of said first and second narrow side openings is slightly larger than a cross-sectional diameter of said wire or thickness of said disc-shape nipple but tis substantially smaller than the diameter of said disc-shape nipple.

2. The wire anchoring apparatus according to claim 1, wherein said drum is provided with a projection upon said circumferential edge, and said wire retaining means is provided within said projection.

3. The wire anchoring apparatus according to claim 1, wherein said wire retaining means is provided within the body of said drum.

4. The wire anchoring apparatus according to claim 1, wherein said recess further comprises an open side recess at the opposite side of said second narrow side opening.

5. The wire anchoring apparatus according to claim 1, wherein said recess further comprises an upper narrow opening directly connected to said second nanrrow side opening.

6. The wire anchoring apparatus according to claim 1, wherein the length of said second narrow side opening is larger than said diameter of said disc-shape nipple.

7. The wire anchoring apparatus according to claim 4, wherein said second narrow side opening is substantially a semi-circular shape.

8. The wire anchoring apparatus according to claim 4, wherein said disc-shape nipple has a cut-off endn at the side opposite to said wire connected thereto.

* * * * *